United States Patent
Sone

[19]

[11] Patent Number: 6,088,576

[45] Date of Patent: *Jul. 11, 2000

[54] RECEIVER PROVIDING SIGNAL RECEPTION IN POWER-OFF STATE

[75] Inventor: Tomoshi Sone, Shizuoka, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/666,204

[22] Filed: Jun. 20, 1996

[30] Foreign Application Priority Data

Jun. 20, 1995 [JP] Japan ................................. 7-153158

[51] Int. Cl.[7] ....................................................... H04B 7/00
[52] U.S. Cl. ........................................... 455/38.3; 455/343
[58] Field of Search ................................ 455/38.3, 38.1, 455/38.2, 38.4, 38.5, 343, 127, 228, 572, 574, 575, 231, 181.1; 340/311.1, 825.44, 825.48

[56] References Cited

U.S. PATENT DOCUMENTS

| | | | |
|---|---|---|---|
| 3,742,481 | 6/1973 | Nickerson | 340/825.48 |
| 4,755,816 | 7/1988 | DeLuca | 455/38.3 |
| 4,860,005 | 8/1989 | DeLuca et al. | 455/343 |
| 5,301,225 | 4/1994 | Suzuki et al. | 455/343 |
| 5,345,605 | 9/1994 | Motegi | 455/181.1 |
| 5,361,397 | 11/1994 | Wright | 455/343 |
| 5,426,422 | 6/1995 | Vanden Heuvel et al. | 340/825.44 |
| 5,566,081 | 10/1996 | Yoshizawa et al. | 455/38.3 |
| 5,627,882 | 5/1997 | Chien et al. | 340/825.44 |
| 5,710,975 | 1/1998 | Bernhardt et al. | 455/38.3 |

*Primary Examiner*—Nguyen Vo
*Attorney, Agent, or Firm*—Sughrue, Mion, Zinn, Macpeak & Seas, PLLC

[57] ABSTRACT

A selective calling receiver having a radio system therein receives a selective calling signal in a first BS (battery-saving) mode when the power switch is in a first state, and receives it in a second BS mode when the power switch is in a second state. According to the first BS mode, power is intermittently supplied to the radio system at all times, and the second BS mode is such that power is intermittently supplied to the radio system for a set time period at intervals so that the selective calling signal is received for the set time period only. The second BS mode is set by determining a reference time point and the set time period such that power is intermittently supplied to the radio system for the set time period with a center time point at the reference time point.

30 Claims, 7 Drawing Sheets

RECEIVER PROVIDING SIGNAL RECEPTION IN POWER-OFF STATE

BACKGROUND OF THE INVENTION

1. Field of the Invention

The present invention relates to a battery-powered radio receiver, and more particularly to a receiver and a battery-saving method-used in a selective calling system.

2. Description of the Related Art

A selective calling receiver has been widely used for various purposes Sine such a receiver is battery-powered and usually taken on the road, needless to say, it is better to work as long a s possible without changing a battery. From this point of view, there have been proposed various battery-saving techniques.

As disclosed in Japanese Patent Laid-open Publication Nos. 62-38625, 1-19660, and 3-67371, conventional receivers have employed an intermittent receiving method such that power is supplied to a radio system only when a group addressed to the receiver itself is received. Since the radio system incorporating a radio receiver consumes a relatively large power, the intermittent receiving method causes its power consumption to be reduced efficiently. In the above-mentioned receivers, the intermittent receiving function is activated only when its power switch is in the ON position and is fully deactivated when the power switch is turned off.

When a user returns to his office or home, however, the selective calling receiver is usually powered off not to consume the battery and may be left alone. Then the user frequently forgets where it is located. Since the intermittent receiving function is fully deactivated when powered off, the receiver remains silent even when a calling signal is being received.

Therefore, it is hard to look for the receiver in a bag or a room. Since a selective calling receiver has been formed recently with enhanced portability, the use has increased difficulty in searching for such a small receiver.

SUMMARY OF THE INVENTION

The present invention has been proposed in order to overcome the aforementioned problems inevitably inherent in the prior art.

Accordingly, it is an object of the present invention to provide a radio receiver which enables receiving a selective calling signal even in the case of its power switch being turned off with efficient battery-saving.

It is another object of the present invention to provide a radio receiver which selects a mode from different operating modes according to the ON/OFF state of the power switch.

It is still another object of the present invention to provide a radio receiver which enables receiving a selective calling signal with reliability even in the case of its power switch being turned off.

It is further still another object of the present invention to provide a power-saving method which enables receiving a selective calling signal even in the OFF state of the power switch with efficient battery-saving and reliability.

In accordance with a first aspect of the present invention, the radio receiver having a radio system therein receives a selective calling signal in a first receiving mode when the power switch is in ON state, and receives it in a second receiving mode when the power switch is in OFF state. The first receiving mode is such that power is supplied to the radio system so that the selective calling signal is received, and the second receiving mode is such that power is supplied to the radio system for a set time period at predetermined intervals so that the selective calling signal is received for the set time period. Since the second receiving mode is activated after the power switch is turned off, the receiving operation is continued intermittently. Further, in the second receiving mode, since power is supplied to the radio system for the set time period at predetermined intervals, efficient power-saving can be achieved while receiving the selective calling signal at predetermined intervals.

The second receiving mode is preferably set by determining a reference time point and the set time period such that power is supplied to the radio system for the set time period with a center time point at the reference time point. Further preferably, power is supplied to the radio system for the set time period at intervals of one hour so that the selective calling signal is received for the set time period in a cycle of one hour. In addition, the reference time point is preferably set to just the hour. Since the reference time point is determined previously, it is possible to call this radio receiver with reliability.

According to a second aspect of the present invention, the radio receiver receives the selective calling signal in the first receiving mode when the power switch is in ON state, receives it in the second receiving mode when the power switch is in OFF state and the second receiving mode is already set, and enters an OFF mode where the receiving operation is stopped when the power switch is in OFF state and the second receiving mode is not set. The OFF mode is such that no power is supplied to the radio system.

According to a third aspect of the present invention, a first battery-saving mode is performed when the power switch is in ON state, the first battery-saving mode being such that power is intermittently supplied to the radio system so that the radio signal is received. Subsequently, when the power switch is turned off, it is checked whether a second battery-saving mode has been set which is such that power is intermittently supplied to the radio system for the set time period at predetermined intervals so that the radio signal is received for the set time period. And, when the power switch is in OFF state and the second battery-saving mode has been set, the second battery-saving mode is performed. Alternatively, when the power switch is in OFF state and the second battery-saving mode has not been set, the OFF mode is performed. The second battery-saving mode, as in the second receiving mode, is set by determining a reference time point and the set time period such that power is intermittently supplied to the radio system for the set time period with a center time point at the reference time point.

The above and other objects and advantages of the present invention will become apparent from the following detailed description when read in conjunction with the accompanying drawings.

DETAILED DESCRIPTION OF THE PREFERRED EMBODIMENTS

Figure 1:
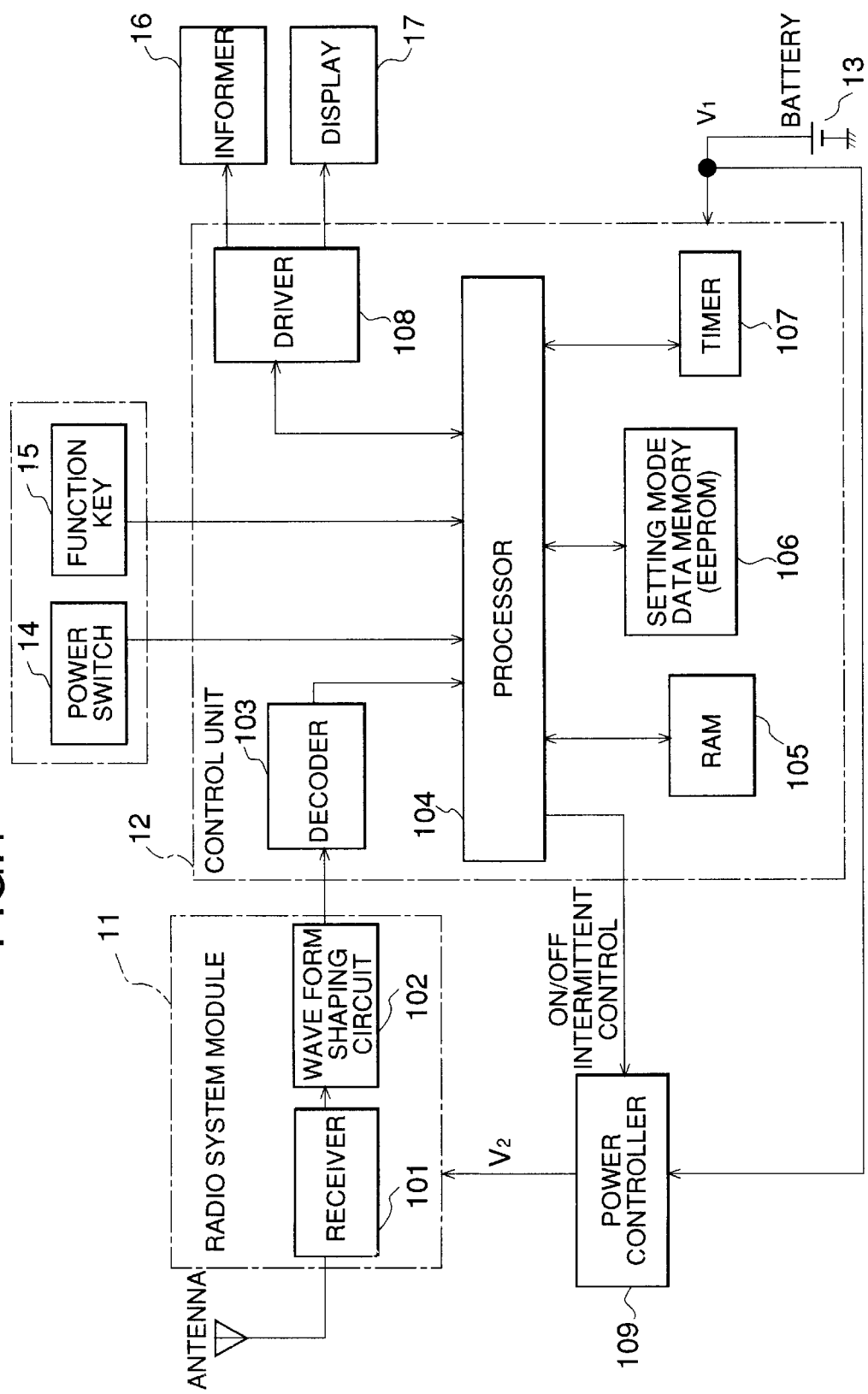
FIG. 1 is a block diagram showing a selective calling receiver according to an embodiment of the present invention.

Referring to FIG. 1, there is shown a selective calling receiver in accordance with the present invention. The selective calling receiver is comprised of a radio system module and a control unit 12 which is connected to a battery 13, a power switch 14, a function key 15, an informer 16 such as a speaker or a vibrator, and a display 17 such as a liquid-crystal display. The radio system module 11 is comprised of a built-in antenna, a receivers,and a wave form shaping circuit 102. The receiver 101 employs a receiving scheme such as homodyne or superheterodyne, receiving a radio signal from a base station (not shown) of a paging system through the antenna. The receiver 101 further includes a demodulator which demodulates the received radio signal into a baseband signal. The waveform shaping circuit 102 shapes the waveform of the baseband signal and the wave-shaped signal is transferred as a selective calling signal from the radio system module 11 to the control unit 12.

The control unit 12 is comprised of a decoder 103, a processor 104, a random access memory 105, a setting mode data memory (EEPROM) 106, a timer 107, a driver 108, and other necessary circuits. The decoder 103 decodes the selective calling signal received from the radio system module 11 and outputs received data to the processor 104. The processor 104 performs the receiving control according to the present invention using the setting data stored in the setting mode data memory 106. The setting mode data memory 106 previously stores the setting data of a battery-saving (BS) mode and a fully-OFF mode. As described in detail later, the processor 104 stores the setting data of a second BS mode into the setting mode data memory 106 according to a user's operation of the function key 15, and switches a receiving mode from the first BS mode to the second BS mode when the user turns off the power switch 14. The processor 104 outputs an intermittent ON/OFF control signal to a power controller 109 so as to perform an intermittent receiving operation. Further, as known well, the processor 104 activates the informer 16 and the display 17 through the driver 108 when a selective calling number included in the received data is identical to the ID number of its own previously stored in the setting mode data memory 106. However, in this embodiment, when the selective calling number is identical to the ID number of its own, it is possible not to activate the informer 16 and the display 17 depending on the setting data for notifying previously stored in the setting mode data memory 106. For simplicity, a read-only memory (ROM) for storing necessary programs and other necessary circuits in the control unit 12 are not shown in FIG. 1.

The power controller 109 receives the battery voltage $V_1$ from the battery 13 and produces a stabilized voltage $V_2$ which is kept at a predetermined voltage level regardless of a variation of the voltage $V_1$ of the battery 13. The voltage $V_2$ is supplied to the radio system module 11 in accordance with the intermittent ON/OFF control signal received from the processor 104. The battery 13 also supplies the control unit 12 with the voltage $V_1$.

More specifically, when the power switch 14 is turned on, the processor 104 reads the first BS mode setting data from the setting mode data memory 106 and generates the intermittent ON/OFF control signal according to the first BS mode. When the power switch 14 is turned off, the processor 104 checks whether the second BS mode has been stored in the setting mode data memory 106. If the second BS mode has been set, the processor. 104 reads the second BS mode setting data from the setting mode data memory 106 and generates the intermittent ON/OFF control signal according to the second BS mode. If the second BS mode has not been set, the processor 104 reads the fully-OFF mode setting data from the setting mode data memory 106 and stops the power controller 109 supplying the radio system module 11 with power. More detailed description will be provided hereinafter.

FIRST BS MODE

Figure 2:
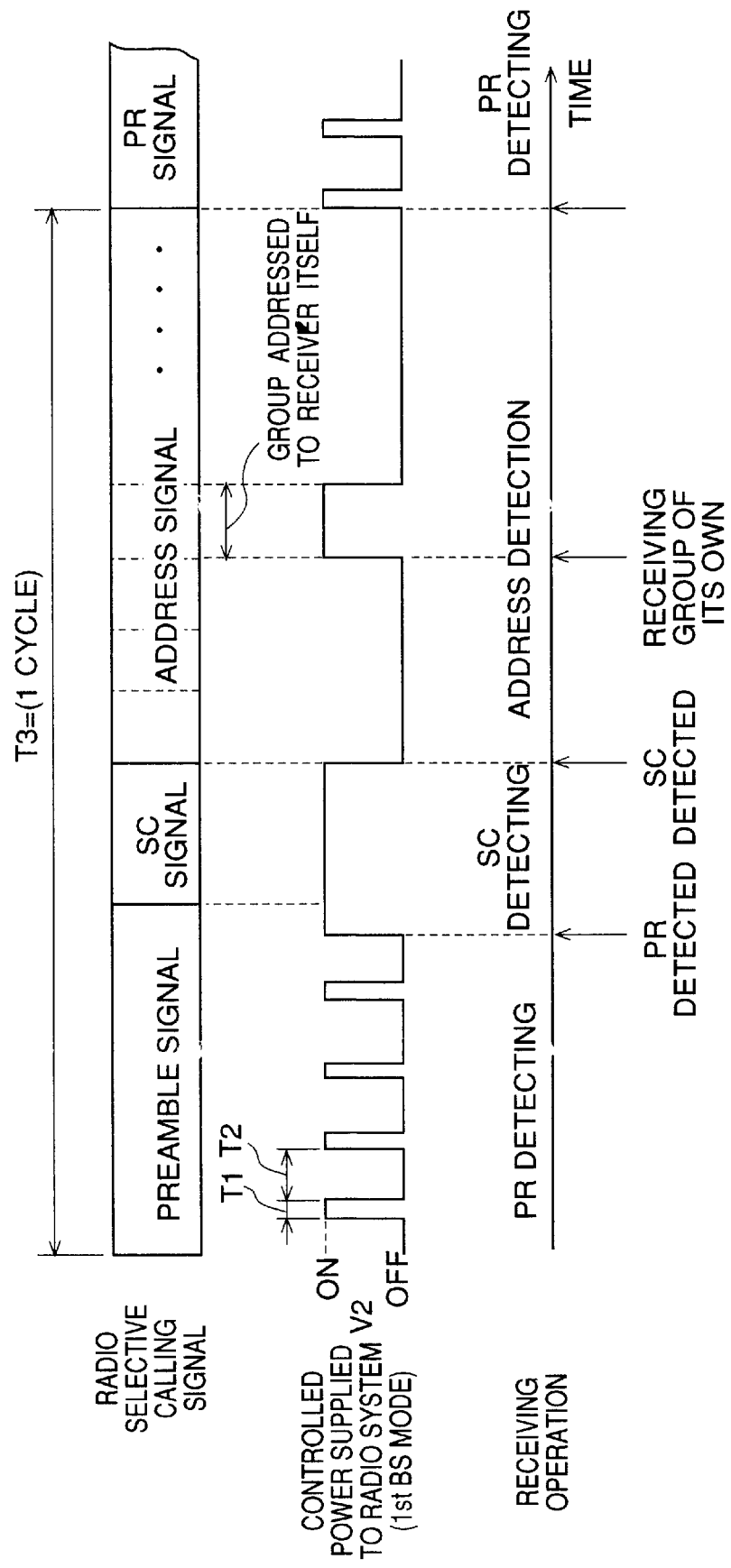
FIG. 2 is a timing chart showing a receiving operation of the selective calling receiver according to the embodiment.

Referring to FIG. 2, a selective calling signal is a sequence of a preamble signal (PR) with a fixed pattern alternating "0" and "1" signals, a synchronization code (SC) signal for frame synchronization, and an address signal consisting of a plurality of frames each including a selective calling number. Taking the POCSAG paging system for example, one cycle is comprised of the preamble signal and a plurality of batches each consisting of a pair of the SC signal and the address signal. As defined in the POCSAG standards, the address signal consists of 8 frames, an available radio frequency band is 150 MHz, 450 MHz, and 900 MHz, and an available bit rate is 512 bits/sec, 1200 bits/sec, and 2400 bits/sec. In the case of the bit rate of 512 bits/sec, the preamble signal is of 1.125 seconds duration including 576 bits, the SC signal of 0.0625 seconds duration including 32 bits, the address signal of 1.0 second duration including 512 bits which is obtained by multiplying 8 frames by 64 bits, and one cycle of 2.1875 seconds duration (T3) including 1120 bits.

According to the first BS mode, as illustrated in FIG. 2, the intermittent ON/OFF control signal alternates ON and OFF during preamble detecting. Since the radio system module 11 is supplied with power only when the intermittent ON/OFF control signal is high (ON), the preamble detecting operation is performed during the ON period T1 and not during the OFF period T2. More specifically, during the ON period T1, the decoder 103 receives the baseband signal from the radio system module 11 and outputs a decoded signal to the processor 104. The processor 104 detects a predetermined pattern of the preamble signal from the decoded signal. In this embodiment, preferably the ON period T1 is 0.1 seconds and the OFF period T2 is 0.9 seconds. After the preamble signal has been detected, the processor 104 keeps the intermittent ON/OFF control signal in the ON state to detect the SC signal from the decoded signal. When the SC signal is detected, the intermittent ON/OFF control signal goes to the OFF state and then intermittently goes to the ON state only when the group addressed to the receiver itself is received during the period of the address signal. In this manner, the intermittent receiving control as mentioned above is performed in cycles when the first BS mode is set.

SECOND BS MODE AND FULLY OFF MODE

Figure 3:
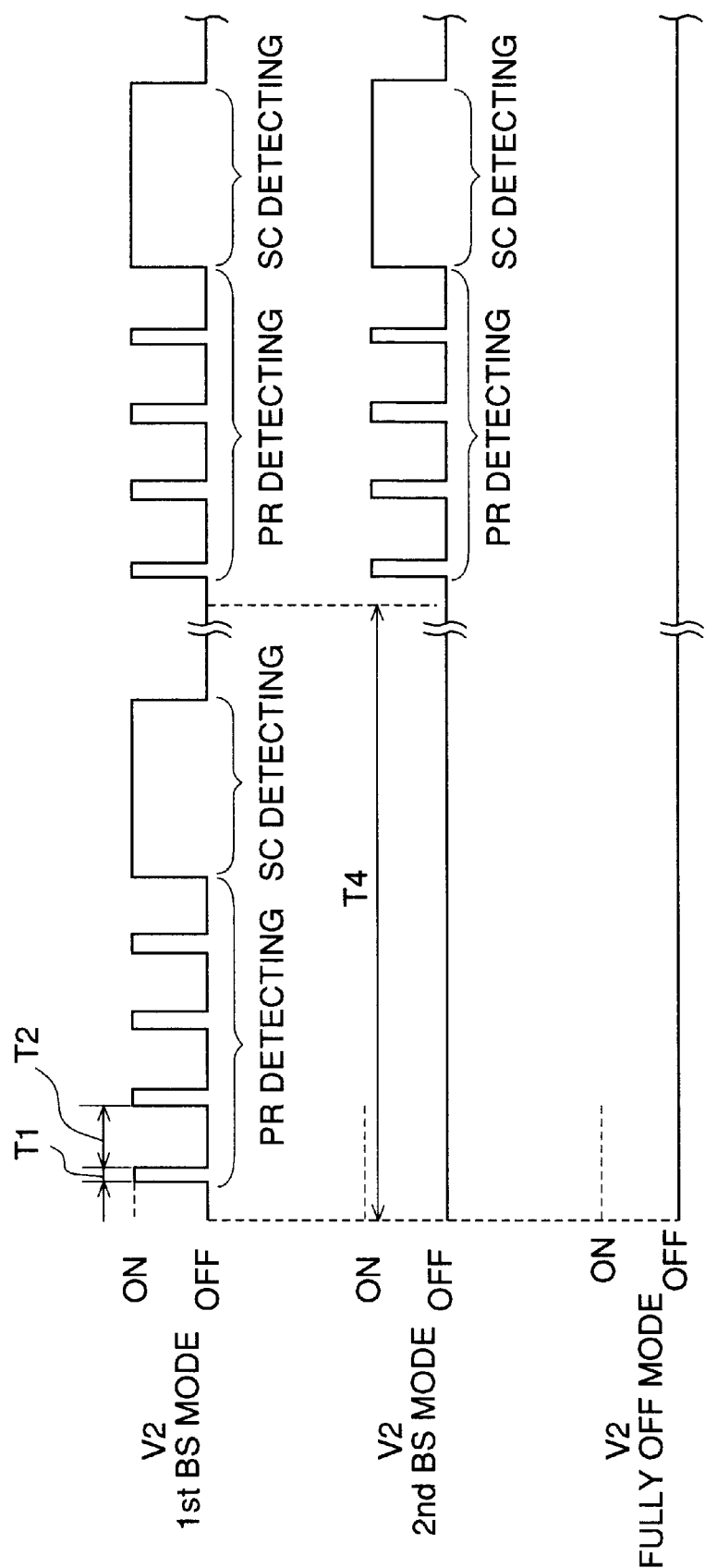
FIG. 3 is a timing chart showing a first and a second battery-saving modes and a fully-OFF mode of the selective calling receiver according to the embodiment.

As shown in FIG. 3, the intermittent receiving control is repeated in cycles in the case of the first BS mode as described above. When the second BS mode has been set, the intermittent receiving control itself is intermittently repeated after the power switch 14 is turned off. More specifically, the intermittent receiving control is repeated at intervals of T4 much longer than one cycle of the selective calling signal. As a matter of convenience, the interval T4 is preferably set to one hour. As described later, the reference time point of the interval T4 and the duration time period of the intermittent receiving control are determined by the user operating the function key 15.

In the case where the user does not set the second BS mode, the fully-OFF mode is performed when the power switch 14 is turned off. In the fully-OFF mode, since no power is supplied to the radio system module 11, the receiving operation is fully stopped.

The receiving operation of the second BS mode is the same as that of the first BS mode. However, in the second BS mode, it is also possible not to activate the informer 16 and the display 17 when the selective calling number is identical to the ID number of its own.

MODE SELECTION

Figure 4:
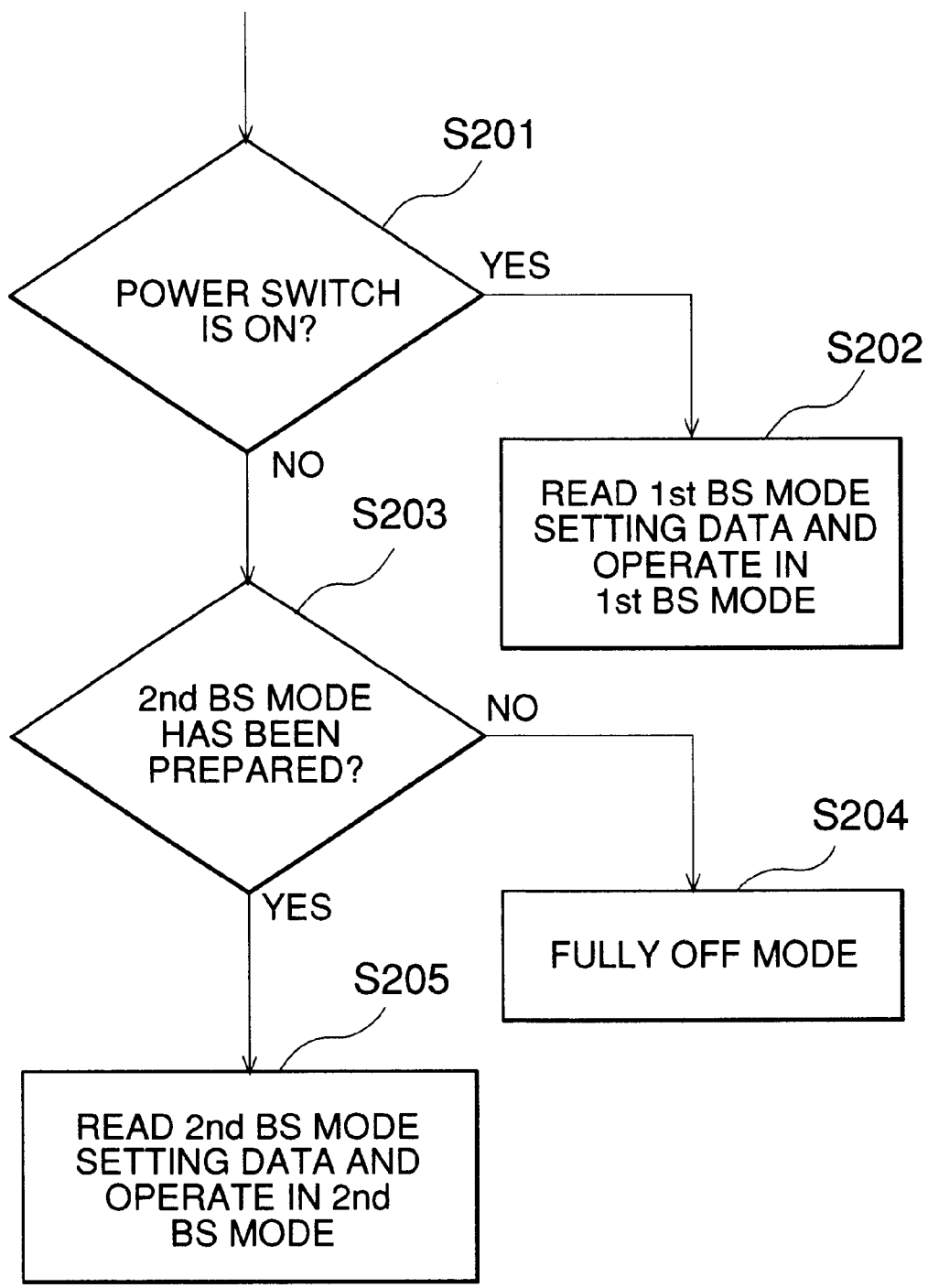
FIG. 4 is a flowchart showing the setting of batterysaving modes depending on the ON/OFF state of a power switch according to the embodiment.

Referring to FIG. 4, the selective calling receiver according the present embodiment changes an operating mode depending on the ON/OFF state of the power switch 14 and on whether the second BS mode has been set. More specifically, the processor 104 monitors the state of the power switch 14 at all times (step S201). When the power switch 14 is in the ON position (YES of step S201), the processor 104 reads the setting data of the first BS mode from the setting mode data memory 106 and starts intermittently receiving a selective calling signal in the first BS mode as described in FIG. 2 (step S202).

On the other hand, when the power switch 14 is OFF (NO of step S201), the processor 104 checks whether the second BS mode has been prepared in the setting mode data memory 106 (step S203). If the second BS mode is not set (NO of step S203), the processor 104 enters into the fully OFF mode where the power controller 109 stops supplying power to the radio system module 11 in accordance with the intermittent ON/OFF control signal (step 204). If the second BS mode is set (YES of step S203), the processor 104 reads the setting data of the second BS mode from the setting mode data memory 106 and starts intermittently receiving a selective calling signal in the second BS mode as described in FIG. 3 (step S205).

SECOND BS MODE SETTING

The selective calling receiver is provided with a current time setting function. The user can set the selective calling receiver to standard time by operating the function key 15 after the power switch 14 is turned off. When detecting the OFF state of the power switch 14 and the time setting operation of the function key 15, the processor 104 sets the timer 107 to the current set time of day according to the user's instructions. After the timer 107 has been set, the user can specify an operation condition of the second BS mode by operating the function key 15. The second BS mode setting operation will be described in detail hereinafter.

Figure 5:
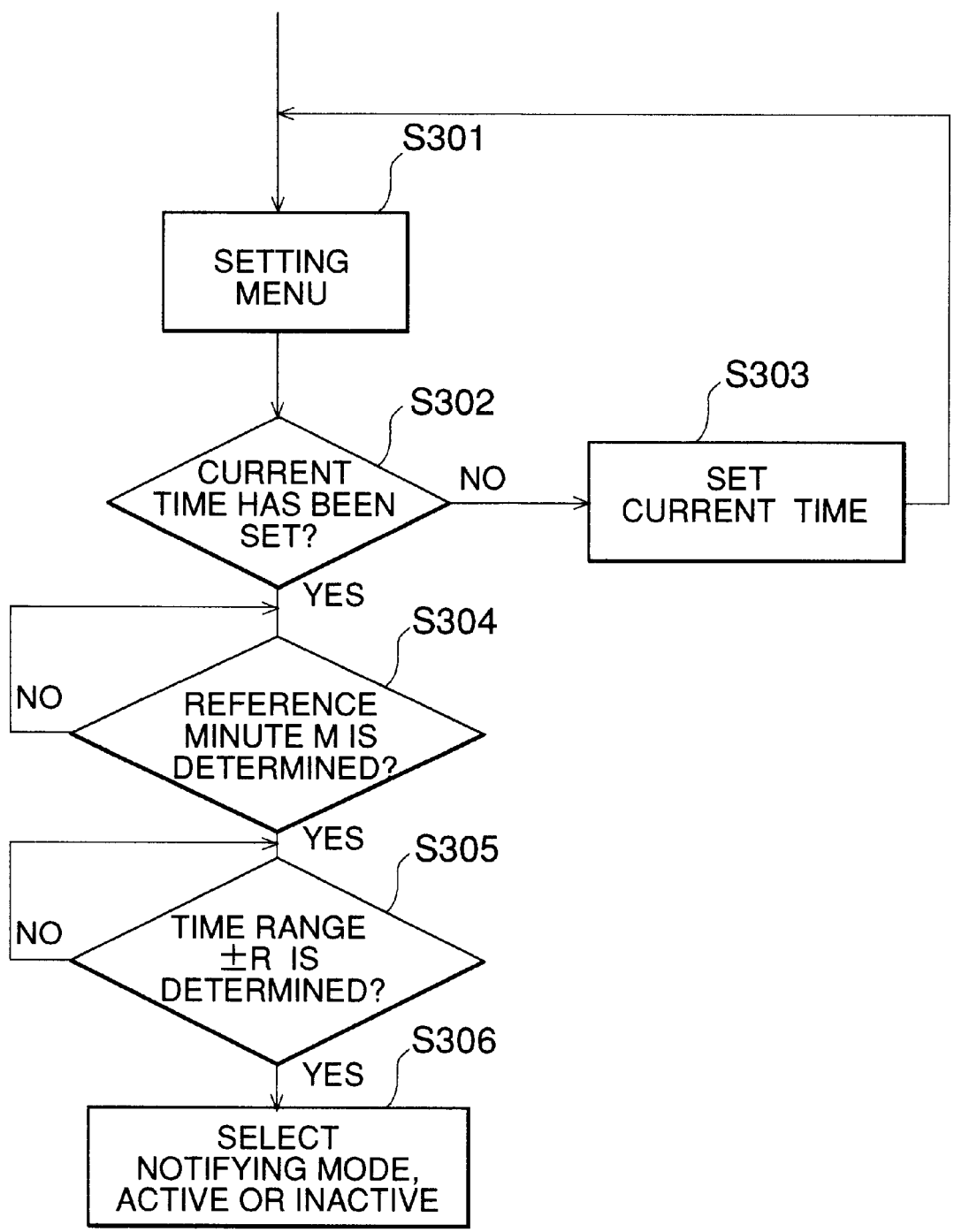
FIG. 5 is a flowchart showing the setting of the second battery-saving mode according to the embodiment.
Figure 6A:
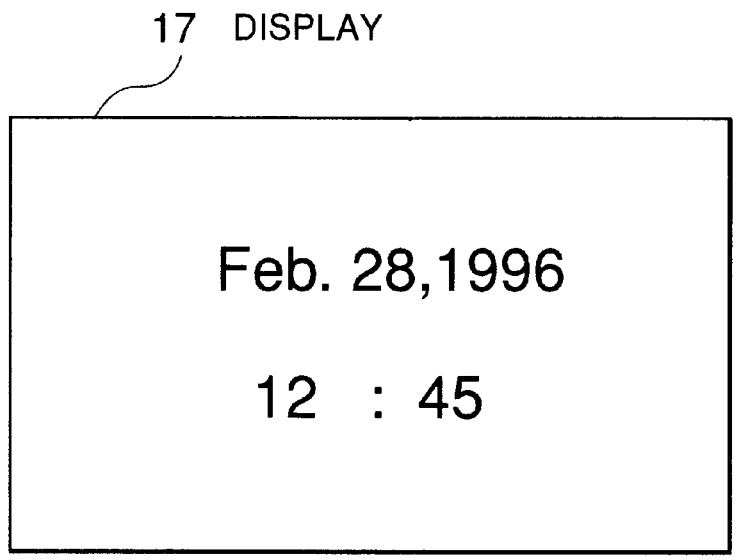
FIG. 6A is a diagram showing an example of the current time setting according to the embodiment.
Figure 6B:
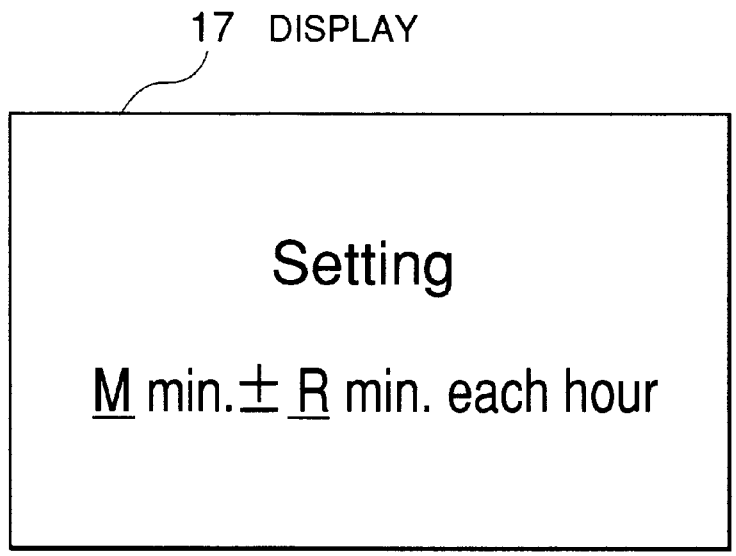
FIG. 6B is a diagram showing an example of the second battery-saving mode setting according to the embodiment.

Referring to FIGS. 5, 6A and 6B, when the second BS mode setting menu is selected by the user operating the function key 15 after the power switch 14 is turned off (step S301), the processor 104 first checks whether the timer 107 is already set to the current time of day (step S302). If the timer 107 is not set (NO of step S302), nothing is displayed on the display 17. In this case, the user, first of all, sets the timer 107 to the current time of day (step 303). If the timer 107 is already set (YES of step S302), the current time of day is displayed on the display 17 as shown in FIG. 6A.

After the current time of day is displayed, the second BS mode setting format is displayed on the display 17 as shown in FIG. 6B. The user can input setting data of the second BS mode through the function key 15 while looking at the second BS mode setting format. More specifically, the user specifies a reference minute M which is a deviation from the hour (step S304) and then the time range ±R during which the intermittent receiving control is performed (step S305). It is preferable that the intermittent receiving control is started R minutes before the hour and is ended R minutes after the hour. The time range ±R may set to an appropriate time period so that the power consumption is sufficiently reduced, for instance, 10 minutes. In this case, the user inputs M=0 and R=5, so that the intermittent receiving control is performed for 10 minutes and is stopped for 50 minutes in each hour.

After the reference minute M and the time range ±R have been determined (YES of step S305), the user selects either an active mode or an inactive mode of the informer 16 when the selective calling number is identical to the ID number of its own (step S306). The reference minute M, the time range ±R, and the notifying mode selection are stored as the second BS mode setting data into the setting mode data memory 106.

RECEIVING OPERATION

Figure 7:
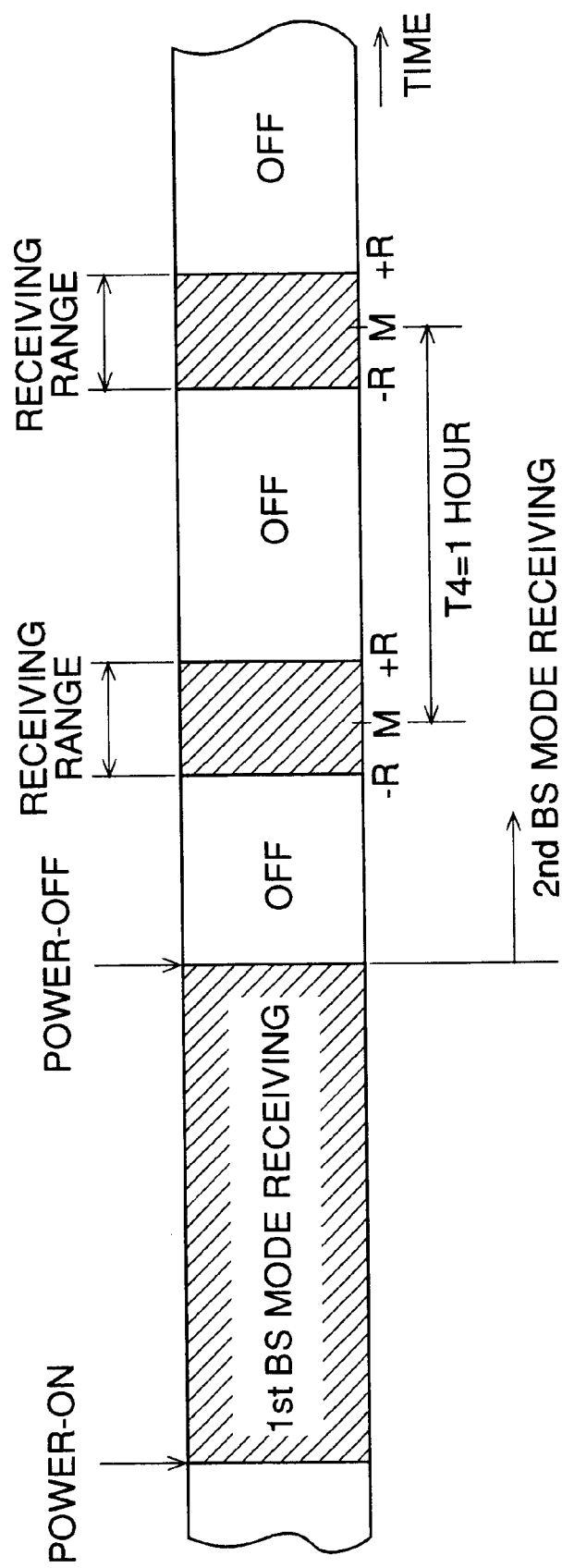
FIG. 7 is a time chart showing a change from the first batter-saving mode to the second battery-saving mode according to the embodiment.

Referring to FIG. 7, the selective calling receiver receives the selective calling signal in the first BS mode when the power switch 14 is turned on. In the case where the second BS mode has been set such that M=0 and R=5, for instance, the operating mode of the selective calling receiver is changed from the first BS mode to the second BS mode at the time when the power switch 14 is turned off.

In the second BS mode as set above, the selective calling receiver is kept in the OFF state until the current time reaches 5 minutes (R=5) before the hour (M=0). When the current time reaches 5 minutes (R=5) before the hour (M=0), the power controller 109 supplies power to the radio system module 11 in accordance with the intermittent ON/OFF control signal received from the processor 104. The intermittent receiving control is continued for 10 minutes and is terminated 5 minutes past the hour. The selective calling receiver is kept in the OFF state until a lapse of 50 minutes from the termination of the intermittent receiving control. And when the current time reaches 5 minutes (R=5) before the hour (M=0) again, the intermittent receiving control is continued for 10 minutes and is terminated 5 minutes past the hour. Such an intermittent receiving operation is repeated in a period of one hour during the power-off state.

Although the receiving period is relatively short in the second BS mode, it is repeated in the predetermined period and further approximately specified by the reference minute M. Therefore, when informing a calling party of the available receiving period, the selective calling receiver can be called just as in the case with the ON state of the power switch 14. This achieves both the reliable selective calling and the efficient battery-saving. For easy-to-remember available receiving period, the reference minute M is preferably set at 0. In this case, the calling party can call this-receiver approximately on the hour.

In the embodiment as shown in FIG. 1, the drive current of the radio system module 11 is about 3.5 mA, that of the control unit 12 is about 120 $\mu$A, and that of the display 17 is about 80 μA. In the first and second BS modes, as shown in FIG. 3, the ON period T1 during which the radio system module 11 is supplied with power on preamble detecting significantly affects the power consumption of the battery 13. However, the total time of the ON periods in the second BS mode is much shorter than in the first BS mode. In this embodiment, the total time of the ON periods in the second BS mode is one-sixth or less that in the first BS mode.

Further, when the power switch 14 is in the OFF state, the control unit 12 is operated at all times even in the fully OFF mode. However, the current required for the control unit 12 is as low as about 120 μA. Therefore, the power consumption of the battery 13 can be negligible. Especially, an increase of the drive current required for the control unit 12 in the second BS mode is one-sixth that in the first BS mode. In this embodiment, an increase of the drive current is about 60 μA. Therefore, even after the power switch 14 is turned off, the selective calling receiver can continue intermittently receiving the selective calling signal in the second bs mode without a significant reduction in the life of the battery 13.

What is claimed is:

1. A radio receiver comprising:
   a power switch operable by a user to select a first state in which the power switch is in an ON position and a second state in which the power switch is in an OFF position;
   a radio system for receiving a selective calling signal;
   power supplying means for supplying power to the radio system; and
   control means for operating the radio receiver in a first receiving mode when the power switch is in the first state and, when a second receiving mode has been set, operating the radio receiver in the second receiving mode when the power switch is in the second state,
   the first receiving mode being such that the power supplying means intermittently supplies power to the radio system, and
   the second receiving mode being such that the power supplying means intermittently supplies power to the radio system for a set time period which is repeated at predetermined intervals starting from when the power switch is moved to the second state from the first state.

2. The radio receiver according to claim 1, further comprising:
   setting means for setting the second receiving mode by inputting setting data such that during the second receiving mode, the power supplying means supplies power to the radio system for the set time period at predetermined intervals.

3. The radio receiver according to claim 2, wherein the setting means includes means for inputting a reference time point and the set time period so that during the second receiving mode, the power supplying means supplies power to the radio system for the set time period with a center time point at the reference time point.

4. The radio receiver according to claim 2, wherein the control means operates the radio receiver in the first receiving mode when the power switch is in the first state, operates the radio receiver in the second receiving mode when the power switch is in the second state and the second receiving mode is already set, and operates the radio receiver in a third mode when the power switch is in the second state and the second receiving mode is not set, the third mode being such that the power supplying means does not supply power to the radio system.

5. The radio receiver according to claim 1, wherein the second receiving mode is such that the power supplying means supplies power to the radio system for a set time period at intervals of one hour so that the selective calling signal is received for the set time period in a cycle of one hour.

6. The radio receiver according to claim 5, further comprising:
   setting means for setting the second receiving mode such that the power supplying means supplies power to the radio system for the set time period at intervals of one hour.

7. The radio receiver according to claim 6, wherein the second receiving mode is set by inputting a reference time point and the set time period such that during the second receiving mode, the power supplying means supplies power to the radio system for the set time period with a center time point at the reference time point.

8. The radio receiver according to claim 7, wherein the reference time point is set to the hour.

9. The radio receiver according to claim 6, wherein the control means operates the radio receiver in the first receiving mode when the power switch is in the first state, operates the radio receiver in the second receiving mode when the power switch is in the second state and the second receiving mode is already set, end operates the radio receiver in a third mode when the power switch is in the second state and the second receiving mode is not set, the third mode being such that the power supplying means does not supply power to the radio system.

10. The radio receiver according to claim 1, wherein:
    the first receiving mode is a first battery-saving mode such that the power supplying means intermittently supplies power to the radio system so that the selective calling signal is received; and
    the second receiving mode is a second battery-saving mode such that the power supplying means intermittently supplies power to the radio system for a set time period at predetermined intervals so that the selective calling signal is received for the set time period.

11. A selective calling receiver for informing a user of call occurrence, comprising:
    a battery;
    a power switch having an ON position corresponding to a first state and an OFF position corresponding to a second state;
    a radio system for receiving a selective calling signal;
    power supplying means for receiving a first voltage from the battery and applying a second voltage to the radio system; and
    setting means for setting a second receiving mode such that the power supplying means intermittently applies the second voltage to the radio system for a set time period which is repeated at predetermined intervals starting from when the power switch is moved to the second state from the first state;
    power control means for operating the radio system in a first receiving mode when the power switch is in the first state and operating the radio system in the second receiving mode when the power switch is in the second state, the first receiving mode being such that the power supplying means intermittently applies the second voltage to the radio system.

12. The selective calling receiver according to claim 11, wherein the setting means includes means for inputting a reference time point and the set time period so that during the second receiving mode, the power supplying means applies the second voltage to the radio system for the set time period with a center time point at the reference time point.

13. The selective calling receiver according to claim 11, wherein the second receiving mode is set such that the power supplying means applies the second voltage to the radio system for the set time period at intervals of one hour.

14. The selective calling receiver according to claim 13, wherein the second receiving mode is set by determining a reference time point and the set time period such that the power supplying means applies the second voltage to the radio system for the set time period with a center time point at the reference time point.

15. The selective calling receiver according to claim 14, wherein the reference time point is set to the hour.

16. The selective calling receiver according to claim 11, wherein the power control means operates the radio system in the first receiving mode when the power switch is in the first state, operates the radio system in the second receiving mode when the power switch is in the second state and the second receiving mode is already set, and operates the radio system in a third mode when the power switch in the second state and the second receiving mode is not set, the third mode being such that the power supplying means does not supply the second voltage to the radio system.

17. The selective calling receiver according to claim 11, wherein:

the first receiving mode is a first battery-saving mode such that the power supplying means intermittently applies the second voltage to the radio system so that the selective calling signal is received; and the second receiving mode is a second battery-saving mode such that the power supplying means intermittently applies the second voltage to the radio system for a set time period at predetermined intervals so that the selective calling signal is received for the set time period.

18. A method for receiving a selective calling signal in a radio receiver comprising a power switch which a user can operate to select a first state corresponding to an ON position and a second state corresponding to an OFF position, and a radio system for receiving a radio signal, the method comprising the steps of:

receiving the selective calling signal in a first receiving mode when the power switch is in the first state, the first receiving mode being such that power is intermittently supplied to the radio system; and receiving the selective calling signal in a second receiving mode when the power switch is in the second state when the second receiving mode has been set, the second receiving mode being such that power is intermittently supplied to the radio system for a set time period which is repeated at predetermined intervals starting from when the power switch is moved to the second state from the first state.

19. The method according to claim 18, wherein the second receiving mode is set by inputting a reference time point and the set time period such that power is applied to the radio system for the set time period with a center time point at the reference time point.

20. The method according to claim 19, wherein the second receiving mode is such that power is supplied to the radio system for a set time period at intervals of one hour so that the selective calling signal is received for the set time period in a cycle of one hour.

21. The method according to claim 20, wherein the reference time point is set to the hour.

22. A method for saving a battery provided in a radio receiver comprising a power switch which a user can operate to select a first state corresponding to an ON position and a second state corresponding to an OFF position, and a radio system for receiving a radio signal, the method comprising the steps of:

performing a first battery-saving mode when the power switch is in the first state, the first battery-saving mode being such that power is intermittently supplied to the radio system so that the radio signal is received;

checking whether a second battery-saving mode has been set when the power switch is in the second state, the second battery-saving mode being such that power is intermittently supplied to the radio system for a set time period which is repeated at predetermined intervals starting from when the power switch is moved to the second state from the first state;

performing a second battery-saving mode when the power switch is in the second state and the second battery-saving mode has been set; and stopping supply of power to the radio system when the power switch is in the second state and the second battery-saving mode has not been set.

23. The method according to claim 22, further comprising the step of setting the second battery-saving mode.

24. The method according to claim 23, wherein the second battery-saving mode is set by inputting a reference time point and the set time period such that power is intermittently supplied to the radio system for the set time period with a center time point at the reference time point.

25. The method according to claim 22, wherein the second battery-saving mode is such that power is intermittently supplied to the radio system for a set time period at intervals of one hour so that the radio signal is received for the set time period in a cycle of one hour.

26. The method according to claim 24, wherein the reference time point is set to the hour.

27. The method according to claim 22, further comprising the step of performing a third mode when the power switch is in the second state and the second battery-saving mode has not been set, the third mode being such that no power is supplied to the radio system.

28. The selective calling receiver according to claim 11, wherein the setting means further sets the second receiving mode such that the user is not informed of the call occurrence.

29. The method according to claim 23, further comprising the step of:

informing a user of call occurrence when performing the first receiving mode.

30. The method according to claim 29, wherein the user is not informed of the call occurrence when performing the second receiving mode.

* * * * *

UNITED STATES PATENT AND TRADEMARK OFFICE
CERTIFICATE OF CORRECTION

PATENT NO. : 6,088,576
DATED : July 11, 2000
INVENTOR(S) : Sone, Tomoshi

It is certified that error appears in the above-identified patent and that said Letters Patent is hereby corrected as shown below:

Column 3, line 21, delete "receivers" insert --receiver 101--.

Column 7, line 18, delete "bs" insert --BS--.

Signed and Sealed this

Twenty-second Day of May, 2001

Attest:

NICHOLAS P. GODICI

Attesting Officer

Acting Director of the United States Patent and Trademark Office